US010805259B2

(12) United States Patent
Dan et al.

(10) Patent No.: US 10,805,259 B2
(45) Date of Patent: Oct. 13, 2020

(54) GEOLOCATION USING REVERSE DOMAIN NAME SERVER INFORMATION

(71) Applicant: Microsoft Technology Licensing, LLC, Redmond, WA (US)

(72) Inventors: Ovidiu Dan, Kirkland, WA (US); Vaibhav Girish Parikh, Bothell, WA (US); Maksym Bondarenko, Redmond, WA (US); Siddhartha Cingh Arora, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 15/798,256

(22) Filed: Oct. 30, 2017

(65) Prior Publication Data

US 2019/0007365 A1    Jan. 3, 2019

Related U.S. Application Data

(60) Provisional application No. 62/527,310, filed on Jun. 30, 2017.

(51) Int. Cl.
*H04L 29/12* (2006.01)
*G06N 20/00* (2019.01)
*G06F 16/29* (2019.01)
*G06F 16/25* (2019.01)

(52) U.S. Cl.
CPC ........ *H04L 61/1511* (2013.01); *G06F 16/258* (2019.01); *G06F 16/29* (2019.01); *G06N 20/00* (2019.01); *H04L 61/2007* (2013.01); *H04L 61/305* (2013.01); *H04L 61/609* (2013.01)

(58) Field of Classification Search
CPC ... G06F 16/9566; G06F 16/48; H04L 61/305; H04L 61/1552
See application file for complete search history.

(56) References Cited

U.S. PATENT DOCUMENTS

| 7,257,570 B2 | 8/2007 | Riise et al. |
| 7,409,708 B2 | 8/2008 | Goodman et al. |
| 8,788,437 B2 | 7/2014 | Prieditis |
| 9,037,694 B2 | 5/2015 | Winkler |
| 9,292,493 B2 | 3/2016 | Chandramouli et al. |
| 2016/0021503 A1 | 1/2016 | Tapia |

(Continued)

OTHER PUBLICATIONS

Huffaker et al., "DRoP: DNS-based Router Positioning", Jul. 2014, ACM SIGCOMM Computer Communication Review, vol. 44, No. 3. (Year: 2014).*

(Continued)

*Primary Examiner* — Apu M Mofiz
*Assistant Examiner* — Sheryl L Holland

(57) ABSTRACT

Generating an improved/more accurate geolocation database is provided. Given a dataset of reverse DNS hostnames for IP addresses, ground truth information, and a hierarchical geographical database, a machine learning classifier can be trained to extract and disambiguate location information from the reverse DNS hostnames of IP addresses and to apply machine learning algorithms to determine location candidates and to select a most probable candidate for a reverse DNS hostname based on a confidence score. The classifier can be used to generate an accurate geolocation database, or to provide accurate geolocation information as a service.

20 Claims, 13 Drawing Sheets

(56) References Cited

U.S. PATENT DOCUMENTS

2016/0036777 A1* 2/2016 Bartlett ................ H04L 61/609
       709/245
2017/0034016 A1* 2/2017 Carroll ................ H04L 41/0813

OTHER PUBLICATIONS

Montanes et al., "Dependent binary relevance models for multi-label classification", 2013, Elsevier. (Year: 2013).*
T. White, "Consistent Hashing", 2007, www.tom-e-white.com/2007/11/consistent-hashing.html. (Year: 2007).*
A. Alur, "Gathering Information about Network Infrastructure from DNS Names and its Applications", 2015, Graduate School of the University of Oregon. (Year: 2015).*
Freedman et al., "OASIS: Anycast for Any Service", 2006, USENIX Association. (Year: 2006).*
Sarlis et al., "Datix: A System for Scalable Network Analytics", 2015, ACM SIGCOMM. (Year: 2015).*
Dan et al., "IP Geolocation through Reverse DNS", Nov. 10, 2018, www.arxiv.org. (Year: 2018).*
Eriksson, et al., "A Learning-based Approach for IP Geolocation", In Proceedings of the 11th international cnference on Passive and active measurement, Apr. 7, 2010, 10 pages.

* cited by examiner 102a-n

| IP Address | Reverse DNS Hostname |
|---|---|
| 4.209.179.96 | dial1.sandiego1.bigisip.net |
| 24.153.133.145 | rrcs-24-153-133-145.sw.biz.provider1.com |
| 178.116.57.128 | 178-116-57-128.access. provider2.be |
| 47.45.18.161 | 47-45-18-161.dhcp.unas.mo. provider3.com |
| 151.241.106.95 | 151-241-106-95. provider4.ir |
| 221.19.146.76 | softbank221019146076. Provider5.net |
| 187.40.87.14 | 187-40-87-14.user.provider6.com.br |
| 75.186.38.64 | cpe-75-186-38-64.cinci.res.provider7.com |
| 54.92.40.138 | ec2-54-92-40-138.ap-northeast-1.compute.provider8.com |
| 177.84.42.121 | dynamic-177-84-42-121.provider9.net.br |
| 75.132.63.38 | 75-132-63-38.dhcp.stls.mo.provider10.com |

104a-n

FIG. 1A ce-salmor@w03w.cpe.or.portland.bigisp.net —104

| Location Candidate | Classifier Output Label (does this location candidate look valid?) | Classification Score (how likely is it that this candidate is valid?) |
|---|---|---|
| Salem -- OR -- US | TRUE | 10,000,000.00+ |
| Portland -- OR -- US | TRUE | 110.82 |
| Portland -- MI -- US | TRUE | 1.91 |
| Portland -- TN -- US | TRUE | 1.88 |
| Portland -- ME -- US | TRUE | 1.39 |
| Portland -- TX -- US | TRUE | 1.38 |
| Portland -- ENG -- GB | TRUE | 1.38 |
| Portland -- 07 -- AU | TRUE | 1.38 |
| Portland -- IN -- US | TRUE | 1.37 |
| Portland -- CT -- US | TRUE | 1.37 |
| Portland -- 02 -- AU | TRUE | |
| ... | ... | ... |
| Malabrigo -- 21 -- AR | FALSE | .11 |
| Colona Elisa -- 03 -- AR | FALSE | .12 |
| Reghin -- 27 -- RO | FALSE | .12 |
| Romanesti -- 07 -- RO | FALSE | .11 |
| Salmoral -- 55 -- ES | FALSE | .05 |
| ... | | ... |

314 → Salem – OR –US

| Feature Name | Value |
|---|---|
| AlternateCityAbbreviationMatch | FALSE |
| AlternateCityAbbreviationPopulation | 0 |
| AlternateCityAbbreviationLetters | 0 |
| AlternateCityNameMatch | FALSE |
| AlternateCityNamePopulation | 0 |
| AlternateCityNameLetters | 0 |
| CityAbbreviationMatch | FALSE |
| CityAbbreviationPopulation | 0 |
| CityAbbreviationLetters | 0 |
| CityAdmin1NameMatch(salmor) | TRUE |
| CityAdmin1NamePopulation | 154637 |
| CityAdmin1LettersBoth | 6 |
| CityAdmin1LettersCity | 4 |
| CityAdmin1LettersAdmin1 | 2 |
| CityCountryNameMatch | FALSE |
| CityCountryNamePopulation | 0 |
| CityCountryNameBoth | 0 |
| CityCountryNameCity | 0 |
| CityCountryNameCountry | 0 |
| ExactCityNameMatch | FALSE |
| ExactCityNamePopulation | 0 |
| ExactCityNameLetters | 0 |
| FirstLettersCityNameMatch | FALSE |
| FirstLettersCityNamePopulation | 0 |
| FirstLettersCityNameLetters | 0 |
| FirstLettersCityNameLettersRatio | 0 |
| NoVowelsCityNameMatch | FALSE |
| NoVowelsCityNamePopulation | 0 |
| NoVowelsCityNameLetters | 0 |
| NoVowelsCityNameLettersRatio | 0 |
| ExactAdmin1NameMatch("or") | TRUE |
| ExactAdmin1Letters | 2 |
| ExactCountryNameMatch | FALSE |
| ExactCountryLetters | 0 |
| TLDMatch | FALSE |
| FirstLettersAdmin1NameMatch | FALSE |
| FirstLettersAdmin1Letters | 0 |
| FirstLettersAdmin1LettersRatio | 0 |

FIG. 5B

GEOLOCATION USING REVERSE DOMAIN NAME SERVER INFORMATION

CROSS REFERENCE TO RELATED APPLICATIONS

This application claims the benefit of U.S. Provisional Application No. 62/527,310, having the title of "Improving IP Geolocation Using Reverse DNS Information" and the filing date of Jun. 30, 2017, which is incorporated herein by reference in its entirety.

BACKGROUND

Search engines oftentimes use a user's location to customize results shown on a page. For example, for a query "weather," a search engine can display a weather forecast based on the location context of the user. Other types of page regions (e.g., answers) on a search engine result page (SERP) make use of users' locations, such as: web search results rankings based on location (e.g., when a user searches for "DMV," the search engine can show web search result links for DMV offices which are geographically close to the user); local results (e.g., when a user searches for "Thai restaurants," the search engine can show web search results for local Thai restaurants); movies playing in a cinema close to the user (e.g., "movies playing near me"); personalized news based on location (e.g., "local news"); location-based advertising (e.g., "plumbers"); and the like.

One way to determine the location of a user is to use positioning systems such as the Global Positioning System (GPS). Unfortunately, this information is not available for most users, as the users would need to use a computing device with GPS and would also need to grant the search engine access to this information. Another method to determine a user's location is to ask the user to self-report it. While this might be accurate in the short-run, in the long-run the user might move to another location without updating the self-reported location.

To overcome the limitations above, in most cases the location of the user is determined by consulting an IP (Internet Protocol) geolocation database that comprises ranges of IP addresses and their corresponding locations. For example, when a user visits a search engine, the geolocation database is used to determine the user's most likely geographical location. The granularity of the geolocation databases varies, but in some examples, a location can be determined down to a neighborhood or street level.

As can be appreciated, accuracy of IP geolocation databases is important to producing relevant search engine results. Consider, for example, that if the search engine returns a weather forecast in an incorrect location, the user might be dissatisfied with the online service. IP geolocation databases are oftentimes used extensively in other industries as well, such as in credit card fraud protection, content delivery networks, organizations with regional offices, and e-commerce. Not being able to accurately determine a user's location due in part to inaccurate IP geolocation databases can have a negative impact on user retention and revenue.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Aspects are directed to a system, method, and computer readable storage device for improving the accuracy of geolocation databases. According to aspects, a geolocation database generation system extracts and disambiguates the location of IP (Internet Protocol) addresses by consulting their reverse DNS (Domain Name System) hostnames using a machine learning approach. The geolocation database generation system is operative or configured to receive an IP address, and convert the IP address into at most one DNS hostname. The geolocation database generation system includes a classifier trained by extracting geographical features from hostnames and using ground truth data as training labels. The classifier is operative or configured to receive a DNS hostname, and output a list of potential geographical locations (e.g., cities, counties, states) that are extracted from the DNS hostname, along with binary labels and classification scores. The classifier is designed to operate efficiently and in some examples, can be distributed across a cluster of machines working together in parallel. By improving the accuracy of IP geolocation databases, search engines and services that rely on determining a user's location, such as credit card fraud protection services, content delivery services, e-commerce, and the like, are enabled to determine users' locations more accurately for producing more accurate and relevant results, which positively impacts user experience, satisfaction, and retention, and accordingly, revenue.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings:

FIG. 1A shows a table of example IP addresses and their corresponding reverse DNS hostnames;

FIGS. 5A and 5B are illustrations of an example input and outputs of a classifier using aspects of the intelligent conversation response system;

DETAILED DESCRIPTION

Figure 1B:
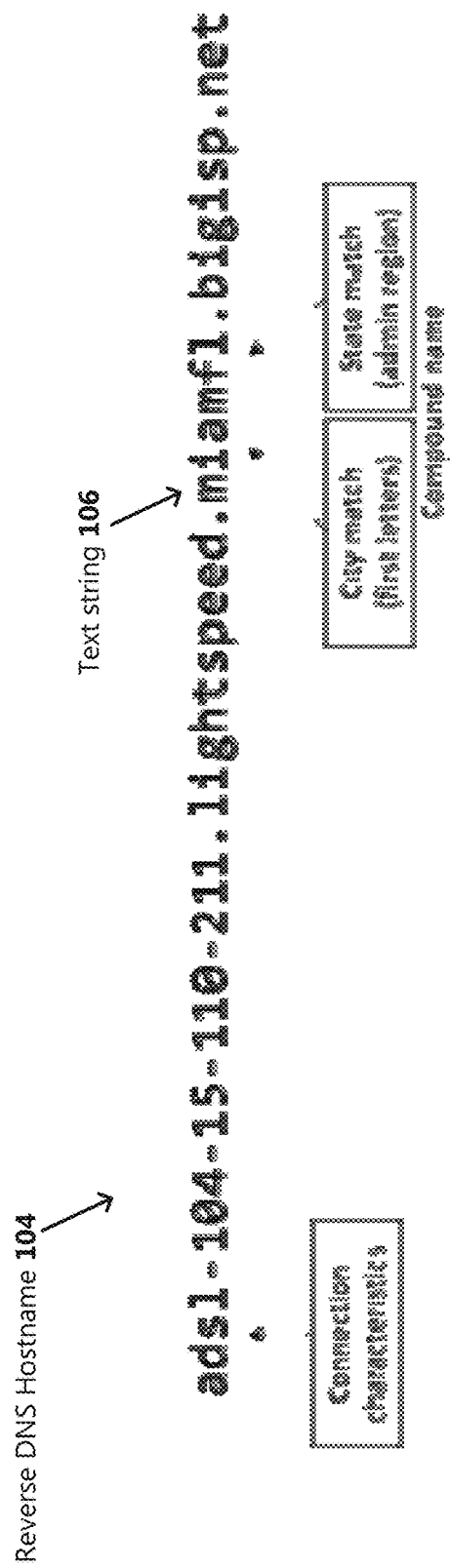
FIG. 1B shows an example reverse DNS hostname comprising a text string that indicates its geographical location.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a system, method, and computer readable storage device for improving the accuracy of geolocation databases. For example, given a dataset of reverse DNS (Domain Name System) hostnames for IP (Internet Protocol) addresses, ground truth information, and a hierarchical geographical database, a machine learning classifier can be trained to extract and disambiguate location information from the reverse DNS hostnames of IP addresses and to apply machine learning algorithms to determine location candidates and to select a most probable candidate for a reverse DNS hostname. The classifier can be used to generate an accurate geolocation database, or to provide accurate geolocation information as a service.

According to aspects, a large percentage of Internet IP addresses have a reverse DNS hostname. For example, the IP address 4.209.179.96 maps to the reverse DNS hostname dial1.sandiego1.bigisip.net. In FIG. 1A, a sampling of example IP addresses 102*a*-*n* (collectively 102) and their corresponding reverse DNS hostnames 104*a*-*n* (collectively 104) are provided. As is known in the art, the reverse DNS hostname 104 of an IP address 102 is often different from a website domain. For example, the website www.microsoft.com resolves to the forward IP address 69.192.204.8. However, the same IP address 69.192.204.8 maps to the reverse DNS hostname a69-192-204-8.deploy.akamaitechnologies.com.

To determine the IP address 102 of a website, the website is an input in a DNS request, and the output is the website's IP address. To determine the reverse DNS hostname 104 of an IP address 102, the IP address 102 is an input in a reverse DNS request to a DNS server, and the output is the reverse DNS hostname. Reverse DNS hostnames 104 often contain clues about connection characteristics (e.g., "dhcp", "dynamic", etc.) and sometimes about the company that manages them (e.g., "telenet.be", "charter.com", "amazonaws.com", etc.). In some examples and as illustrated in FIG. 1B, a reverse DNS hostname 104 includes one or more text strings 106 indicative of its geographical location. For example, one familiar with reverse DNS hostname naming practices could conclude that the IP address 102 associated with the example reverse DNS hostname 104 "adsl1-104-15-110-211.lightspeed.miamfl.biisp.net" is likely located in Miami, Fla. In addition to location information, the connection speed (ADSL) can be inferred from the reverse DNS hostname 104.

Figure 2:
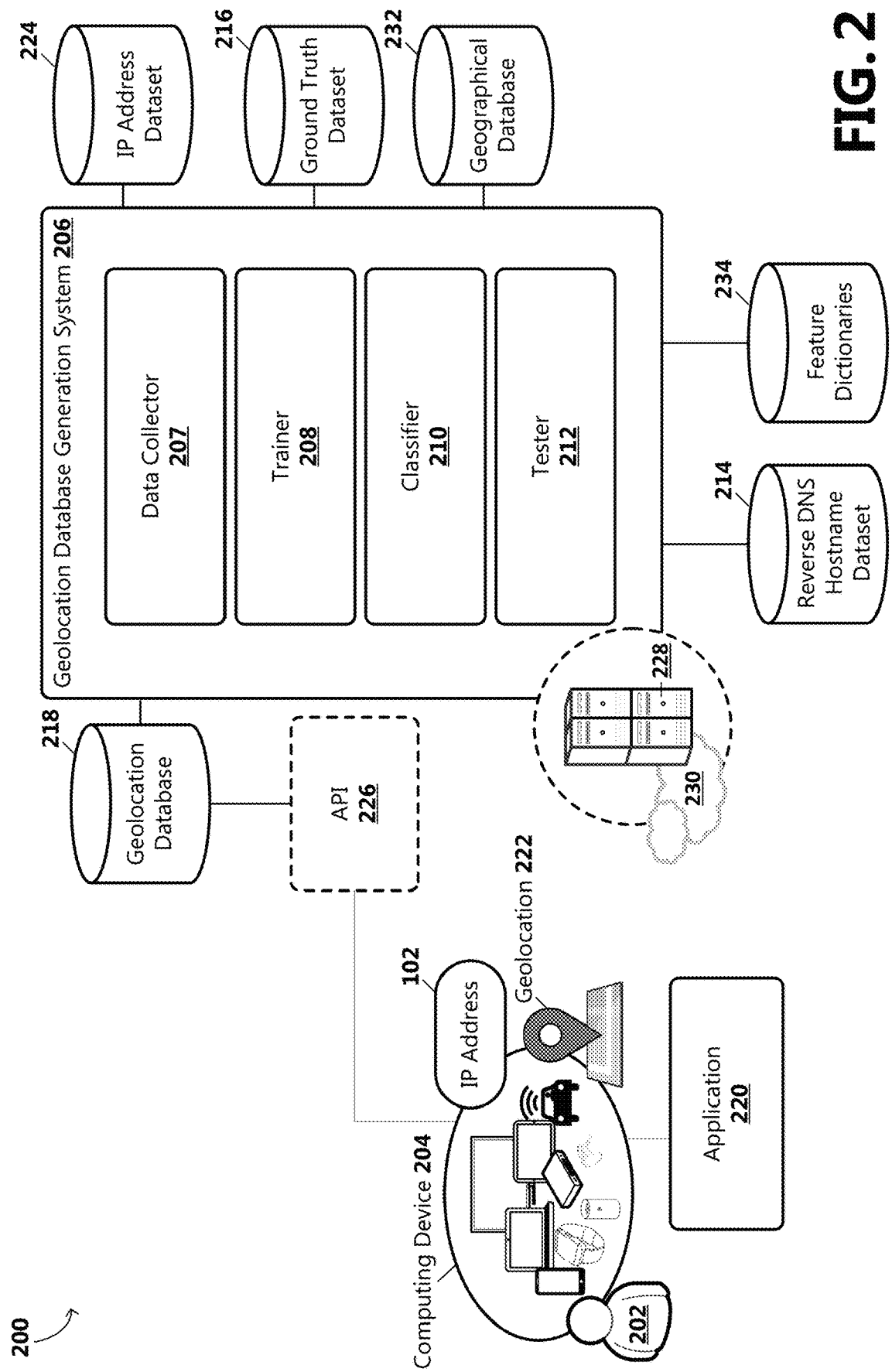
FIG. 2 is a block diagram illustrating an example environment in which a geolocation database generation system can be implemented for improving the accuracy of geolocation databases.

Referring now to FIG. 2, a block diagram is illustrated that represents a computing environment 200 in which improving the accuracy of geolocation databases can be implemented. As illustrated, the example environment 200 includes a computing device 204. The computing device 204 can be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, a speaker device, an Internet of Things (IoT) device, or other type of computing device). The hardware of these computing devices is discussed in greater detail in regard to FIGS. 7, 8A, 8B, and 9. According to an aspect, the computing device 204 comprises a unique IP address 102 that is used for enabling the computing device to identify itself and to communicate with other computing devices in an IP network 230. For example, any computing device connected to the IP network 230 has a unique IP address within the network 230.

In some examples, the computing device 204 is operative or configured to execute an application 220 that uses a geolocation 222 of the computing device user 202 or another computing device user's geolocation for providing content or services based on the user's determined geolocation. According to an aspect, the computing device 204 or the application 220 is operative or configured to retrieve geolocation 222 data from a geolocation database 218 for providing content or services based on the user's (or another user's) determined geolocation. For example, the geolocation database generation system 206 or the geolocation database 218 includes an API 226 (application programming interface) that can be used by a computing device 204 or an application 220 to retrieve geolocation data from the geolocation database 218. In some examples, geolocation information can be provided as a service by using the API 226 to crawl a reverse DNS database and provide a listing of corresponding geolocations 222.

According to an aspect, the computing environment 200 includes a geolocation database generation system 206, which operates on one or more remote computing devices or server computers 228 that are communicatively attached through a network 230 or a combination of networks (e.g., a wide area network (e.g., the Internet), a local area network, a private network, a public network, a packet network, a circuit-switched network, a wired network, or a wireless network). For example, the components of the geolocation database generation system 206 can be located on a single computer (e.g., server computer 228), or one or more components of the geolocation database generation system 206 can be distributed across a plurality of devices. According to an aspect, the geolocation database generation system 206 includes a data collector 207 operative or configured to collect data for enabling the trainer 208 to train the classifier 210. After the classifier 210 is trained, it is operative or configured to extract and disambiguate location information from reverse DNS hostnames 104 of IP addresses 102, apply machine learning algorithms to determine location candidates, and select a most probable candidate for a reverse DNS hostname based on a highest ranked confidence score. For example, the classifier 210 is used to generate the geolocation database 218 that includes accurate geolocation 222 data of IP addresses 102.

According to one aspect, the data collector 207 is operative or configured to provide a reverse DNS hostname dataset 214 to the trainer 208. In some examples, the data collector 207 accesses a publicly available DNS hostname dataset to form a reverse DNS hostname dataset 214 comprised of hostnames of IP addresses. According to an example, the reverse DNS hostname dataset 214 comprises all the hostnames of IPv4 addresses and a sampling of hostnames of IPv6 addresses. In other examples, the data collector 207 extracts reverse DNS hostnames 104 from an IP address dataset 224. As should be appreciated, there are billions of possible IP address combinations that have reverse DNS hostnames. In some examples, the data collector 207 uses a centralized master/slave relationship to crawl an IP address dataset 224, for example, using a master machine and a cluster of slave servers 228. The master machine is operative or configured to split the IP address dataset 224 into a plurality of buckets, and to assign each bucket to a slave machine. Each slave machine crawls the IP addresses 102 in its assigned bucket, and makes DNS server requests for the reverse DNS hostname 104 of each IP address. The master machine is further operative or configured to aggregate the crawl results from each slave machine, and generate a reverse DNS hostname dataset 214. To ensure that neither the master machine nor the slave machines overwhelm the DNS servers with requests, in some examples, each machine throttles the number of connections to each DNS server and the connection rate.

In other examples, the data collector 207 uses a plurality of servers 228 in a master-less relationship with consistent hashing to crawl an IP address dataset 224. For example, given a single IP address range (e.g., the entire IPv4 space or a very large IPv6 space), each server 228 is aware of the target IP range, the total number of servers, and the index of the current server in the list of all servers (the position in the list of all servers). Using consistent hashing, each server can automatically determine which subset of the IP range for which it is responsible. After each machine completes crawling its assigned subrange, it can store the results locally or generate a centralized reverse DNS hostname dataset 214 stored in a centralized data store.

According to one aspect, the data collector 207 is operative or configured to provide a ground truth dataset 216 to the trainer 208. For example, the ground truth dataset 216 comprises a list of IP address ranges and their known geolocation 222 (e.g., latitude and longitude). In some examples, the ground truth dataset 216 is obtained from logs of a search engine or other application logs collected from computing devices 204 that report both their IP address 102 and their GPS location. For example when using a weather application on a mobile phone (computing device 204), users 202 may be required to share both their IP addresses 102 and their GPS locations to the backend servers to retrieve the weather forecast. This information can be then stored and can form the basis of the ground truth dataset 216.

In training the classifier 210, the trainer 208 is operative or configured to intersect a subset of the ground truth data (which is used as ground truth training data) with the reverse DNS hostname dataset 214. The result is a list of IP addresses 102, their corresponding reverse DNS hostname 104, and their actual physical location (latitude and longitude). As will be described later, the unused subset of the ground truth data will be used for testing the classifier 210.

According to another aspect, the data collector 207 is operative or configured to provide a geographical database 232 to the trainer 208. In some examples, the hierarchical geographical database 232 comprises relationship information between continents, countries, states, and cities. In some examples, the hierarchical geographical database 232 further comprises spelling variations or abbreviations of place names, as well as other points of interest such as airport codes. Databases, such as the hierarchical geographical database 232, are commonly freely accessible.

According to an aspect, based on the hierarchical geographical database 232, the trainer 208 is operative or configured to extract classifier features that are indicative of geographical locations. In some examples, to increase the speed of training the classifier 210, the trainer 208 is operative or configured to precompute granular location level features prior to the training phase. The trainer 208 is operative or configured to iterate over each city in the hierarchical geographical database 232, and extract features, such as the city name, abbreviations, alternate names, administrative regions (e.g., state name), population information, and other features of each city. The table below (Table 1) includes examples of granular location level features. As should be appreciated, other granular location level features are possible and are within the scope of the present disclosure.

TABLE 1

| | Granular Location Level Features |
|---|---|
| City Name Match | Does the target hostname contain the full city name of this current candidate location? Example Input hostname: "ip123.seattle.wa.bigisp.com" Candidate location: Seattle, WA Feature value: True |
| City Name Letters | If City Name Match was True, how many letters has the city name that matched in the hostname? If City Name Match was False, the value of this feature will be null (missing value) or 0, depending on the classifier type. Example Input hostname: "ip123.seattle.wa.bigisp.com" Candidate location: Seattle, WA Feature value: 7 |
| City Name Population | If City Name Match was True, what is the population of the matched city? If City Name Match was False, the value of this feature will be null (missing value) or 0, depending on the classifier type. Example Input hostname: "ip123.seattle.wa.bigisp.com" Candidate location: Seattle, WA Feature value: 668,342 |
| City + Admin1 Name Match | Does the target hostname contain a concatenated combination of city + administrative region 1 (such as State name)? Example Input hostname: "ip123.bostonma.bigisp.com" Candidate location: Boston, MA Feature value: True Alternate feature variations City abbreviation + Admin1 Alternate city name + Admin1 No vowels city name + Admin1 |
| City + Admin 1 Population | If City + Admin1 Name Match was True, what is the population of the matched city. If City + Admin1 Name Match was False, the value of this feature will be null (missing value) or 0, depending on the classifier type. |
| City + Admin 1 Total letters | If City + Admin1 Name Match was True, how many letters were matched in the original string? Example Input hostname: "ip123.bostonma.bigisp.com" |

TABLE 1-continued

Granular Location Level Features

| | |
|---|---|
| | Candidate location: Boston, MA |
| | Feature value: 8 |
| City + Admin 1 - City Letters | If City + Admin1 Name Match was True, how many letters of the city name were matched. |
| | Example |
| | Input hostname: |
| | "ip123.bostonma.bigisp.com" |
| | Candidate location: Boston, MA |
| | Feature value: 6 |
| City + Admin 1 - Admin 1 Letters | If City + Admin1 Name Match was True, how many letters of the Admin1 name were matched. |
| | Example |
| | Input hostname: |
| | "ip123.bostonma.bigisp.com" |
| | Candidate location: Boston, MA |
| | Feature value: 2 |
| City + Country Name Match | Does the target hostname contain a concatenated combination of city + country? |
| | Example |
| | Input hostname: |
| | "ip123.amsterdamnl.bigisp.com" |
| | Candidate location: Amsterdam, NL |
| | Feature value: True |
| | Alternate feature variations |
| | City abbreviation + Country name |
| | Alternate city name + Country name |
| | No vowels city name + Country name |
| | City abbreviation + Alternate country name |
| | Alternate city name + Alternate country name |
| | No vowels city name + Alternate country name |
| City + Country Population | If City + Country Name Match was True, what is the population of the matched city. |
| City + Country Total letters | If City + Country Name Match was True, how many letters were matched in the original string? |
| City + Country - City Letters | If City + Country Name Match was True, how many letters of the city name were matched. |
| City + Country - Country Letters | If City + Country Name Match was True, how many letters of the country name were matched. |
| No vowels City Name Match | Does the target hostname contain the city name of the candidate, without vowels? |
| | Example |
| | Input hostname: |
| | "ip123.sttl.wa.bigisp.com" |
| | Candidate location: Seattle, WA |
| | Feature value: True |
| | Example |
| | Input hostname: |
| | "ip123.evrt.wa.bigisp.com" |
| | Candidate location: Everett, WA |
| | Feature value: True |
| | As we can see in the second example, this feature is a bit more complex than just matching the full name of the city without vowels. |
| | For a given city name, here are the strings that could match: |
| | Variations of strings for candidate: Seattle |
| | sttl (remove all vowels) |
| | Variations of strings for candidate: Everett |
| | vrtt |
| | evrtt (remove all vowels, but keep the first letter even if it is a vowel) |
| | evrt (match only the first 4 letters of the modified string) |
| | evrt (duplicate of the above, but obtained in a different way: remove all vowels, except the first letter, remove all duplicate characters) |
| | Variations of strings for candidate: Los Angeles |
| | lsngls |
| | lsangl (remove the vowels, except if the vowel is the first letter of any word in the name) |
| | lsan (same as above, but restrict to 4 letters, 5 letters, etc.) |

TABLE 1-continued

Granular Location Level Features

| | |
|---|---|
| No vowels City Name Letters | If No vowels City Name Match was True, how many letters were matched in the original string? |
| No vowels City Name Letters Ratio | If No vowels City Name Match was True, what is the ratio of number of letters that were matched in the city name, over the total number of letters in the city name? |
| No vowels City Name Population | If No vowels City Name Match was True, what is the population of the matched city. |
| Alternate City Name Match | Does the target hostname contain an alternate city name of this current candidate location? (city nicknames, spelling variations, names in the local language, etc.) |
| Alternate City Name Letters | If Alternate City Name Match was True, how many letters were matched in the original string? |
| Alternate City Name Population | If Alternate City Name Match was True, what is the population of the matched city. |
| First Letters City Name Match | Does the target hostname contain the first X letters of the candidate city name? |
| | Variations of strings for candidate: Seattle |
| | 3 letters: sea |
| | 4 letters: seat |
| | 5 letters: seatt |
| | 6 letters: seattl |
| | Etc. etc. |
| First Letters City Name Letters | If First Letters City Name Match was True, how many letters were matched in the original string? |
| First Letters City Name Letters Ratio | If First Letters City Name Match was True, what is the ratio of number of letters that were matched in the city name, over the total number of letters in the city name? |
| First Letters City Name Population | If First Letters City Name Match was True, what is the population of the matched city. |
| City Abbreviation Match | Does the target hostname contain the abbreviation of the candidate city name? |
| | Variations of strings for candidate: New York City |
| | nyc |
| City Abbreviation Letters | If City Abbreviation Match was True, how many letters were matched in the original string? |
| City Abbreviation Population | If City Abbreviation Match was True, what is the population of the matched city. |
| Alternate City Abbreviation Match | Does the target hostname contain the abbreviation of the candidate alternate city name? (abbreviations of: city nicknames, spelling variations, names in the local language, etc.) |
| Alternate City Abbreviation Letters | If Alternate City Abbreviation Match was True, how many letters were matched in the original string? |
| Alternate City Abbreviation Population | If Alternate City Abbreviation Match was True, what is the population of the matched city. |
| UNLOCODE Code Match | UN/LOCODE, also called the United Nations Code for Trade and Transport Locations, is a geographic coding scheme developed and maintained by United Nations. It includes codes for over 80,000 geographical locations. |
| | UN/LOCODE examples: |
| | USNYC => New York, NY |
| | FRPAR => Paris France |
| | DEBER => Berlin, Germany |
| | Some Internet service providers have adopted this naming scheme, and they use it in their hostnames. |
| | Hostname example |
| | Input hostname: |
| | "ip123.usnyc.bigisp.com" |
| | Candidate location: New York, NY |
| | Feature value: True |
| UNLOCODE Letters | If UNLOCODE Code Match was True, how many letters were matched in the original string? |
| UNLOCODE Population | If UNLOCODE Code Match was True, what is the population of the matched city. |
| Airport Code Match | There are several international organizations such as IATA, ICAO, FAAC, etc. that assign short names/codes to airports. Some Internet Service providers use these codes in their hostnames. |
| | Airport code examples: |
| | ANR => Antwerp, Belgium |
| | AMS => Amsterdam, The Netherlands |
| | ARW => Arad, ROmania |

TABLE 1-continued

Granular Location Level Features

| | |
|---|---|
| | Hostname example<br>Input hostname:<br>"ip123.seatac.wa.bigisp.com"<br>Candidate location: Seattle, WA<br>Feature value: True |
| Airport Code Letters | If Airport Code Match was True, how many letters were matched in the original string? |
| Airport Code Population | If Airport Code Match was True, what is the population of the matched city. |
| CLLI Code Match | CLLI, which stands for Common Language Location Identifier Code, are identifiers used by the North American telecommunications industry (USA, Canada) to specify the location and function of telecommunication equipment. The first 6 letters of these codes specify the location. Some Internet service providers have adopted these naming conventions and use them in reverse DNS hostnames.<br>CCLI code examples:<br>evrtwa => Everett, WA<br>chcgil => Chicago, IL<br>chchil => Chicago, IL<br>chciil => Chicago, IL<br>Hostname example<br>Input hostname:<br>"ip123.sttl.wa.bigisp.com"<br>Candidate location: Seattle, WA<br>Feature value: True |
| CLLI Code Letters | If CLLI Code Match was True, how many letters were matched in the original string? |
| CLLI Code Population | If CLLI Code Match was True, what is the population of the matched city. |

For each granular location level feature type, the trainer 208 is operative or configured to generate a dictionary 234 comprising a key and a value. According to examples, the key is a string that the classifier 210 will look for in a reverse DNS hostname 104. For example, for the granular location level feature type "city+admin1", a key could be "bstnma", where "bstnma" is a string that could be included in a reverse DNS hostname 104. According to examples, the value is list of candidate locations that match the string, along with features extracted for the location. For example, for the granular location level feature type "city name" and the key "portland", the value can comprise a list of all locations named Portland (e.g., there are at least 10 cities in the United States named Portland). Each of these location candidates include both the main feature (in this example, City Name Match) and related features, such as City Name Letters, City Name Population, etc. For this example, an example output dictionary 234 for the City Name feature and the key "portland" is shown in the table (Table 2) below:

TABLE 2

Example Output Dictionary

| | | Value (this single value comprises a list of potential locations) | | |
|---|---|---|---|---|
| Key | Location | City Name Match | City Name Letters | City Name Population |
| "portland" | Portland - OR - US | true | 8 | 609,456 |
| | Portland - MI - US | true | 8 | 3,914 |
| | Portland - TN - US | true | 8 | 11,993 |
| | Portland - ME - US | true | 8 | 66,318 |
| | ... | ... | ... | ... |

Figure 3A:
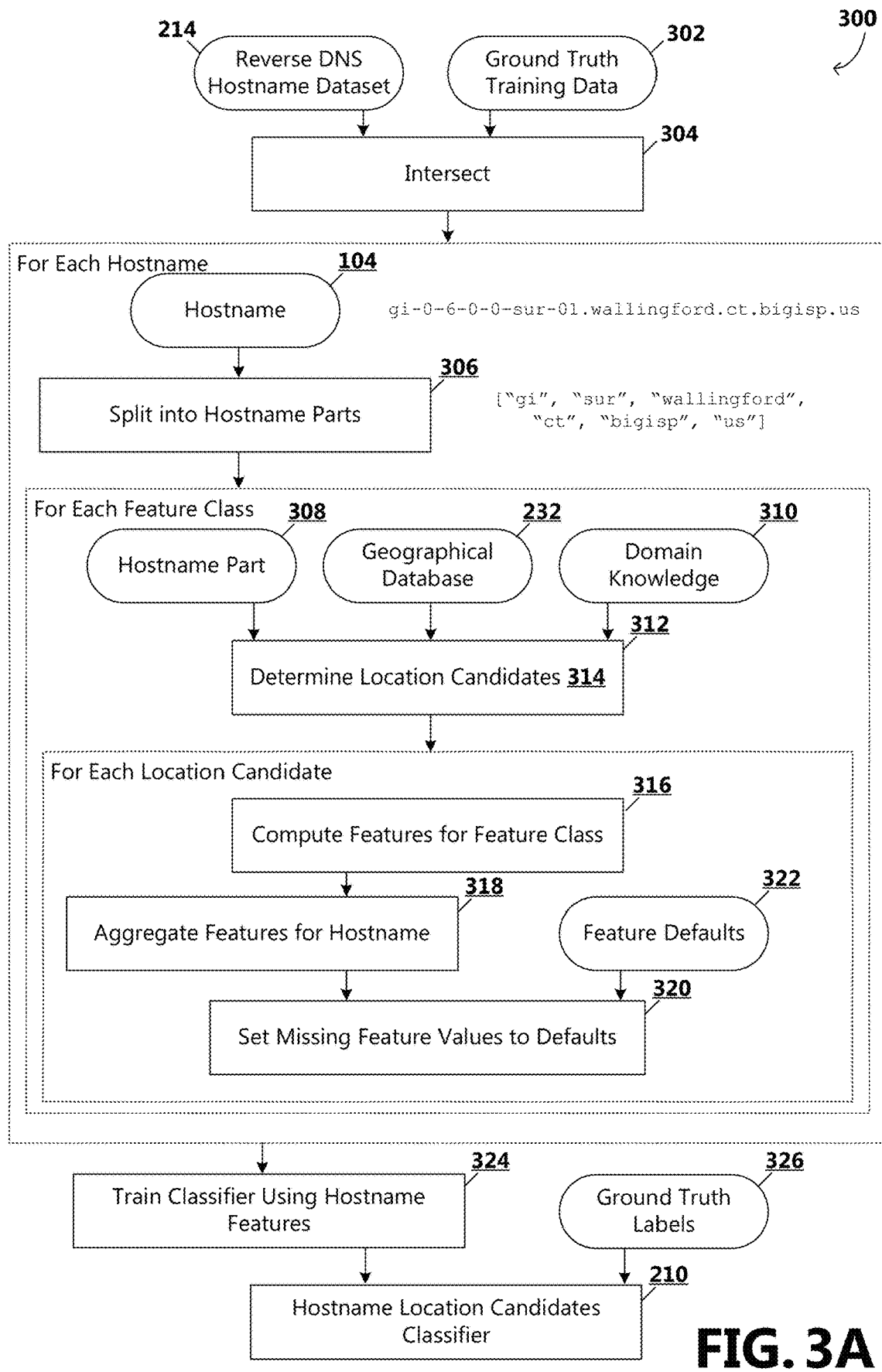
FIG. 3A illustrates a summary of an example single machine classifier training method.
Figure 3B:
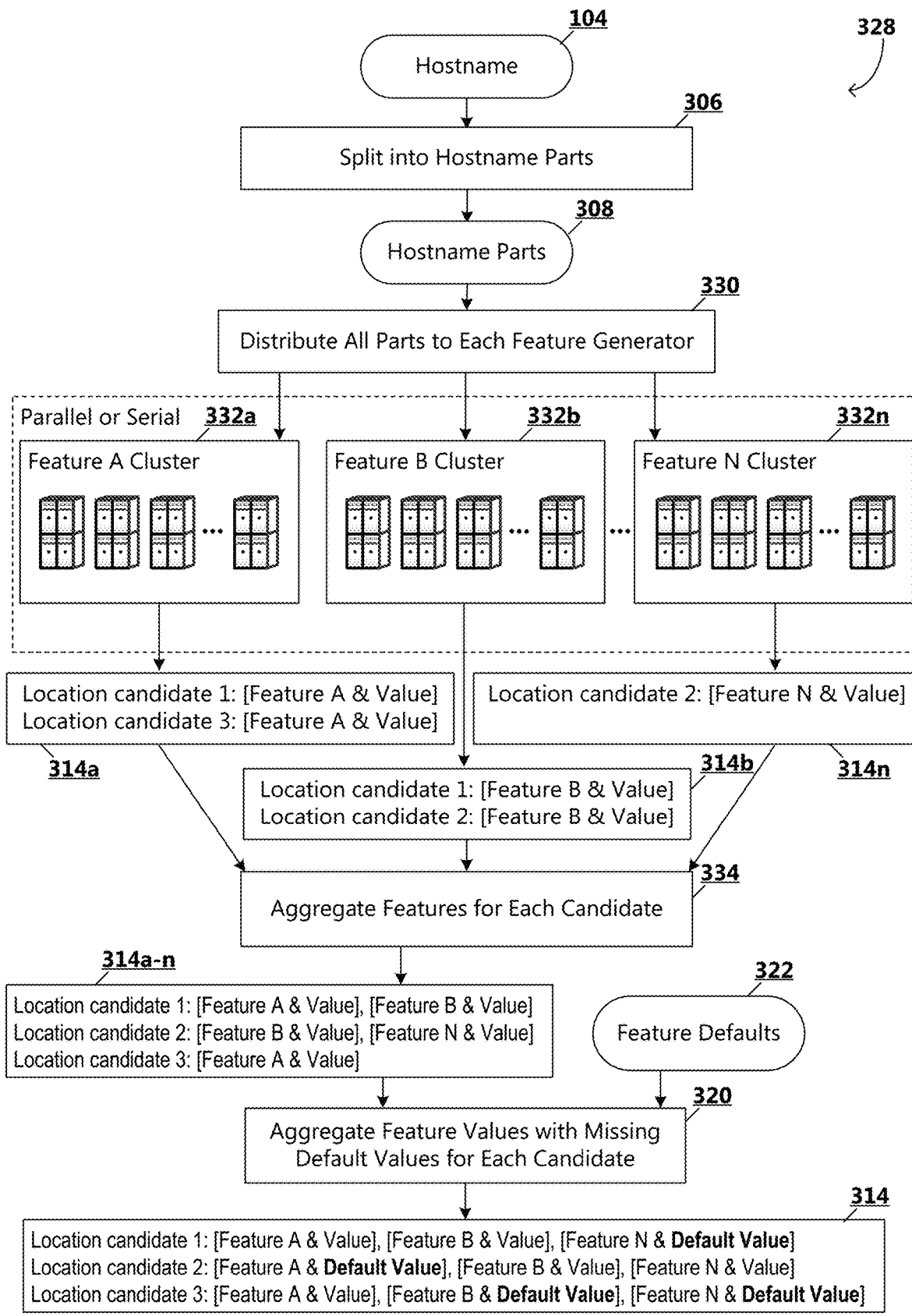
FIG. 3B illustrates a summary of an example distributed cluster classifier training method.

According to an aspect, the trainer 208 is operative or configured to determine candidate locations for an input reverse DNS hostname 104. In some examples, the trainer 208 performs the granular location level feature pre-computation on a single machine. FIG. 3A illustrates a summary of an example single machine classifier training method 300. According to an aspect, granular location level feature pre-computation can be a costly process (e.g., time, computer processing). As an alternative to training on a single machine, the granular location level features can be generated on a distributed cluster of machines in parallel. For example, each machine in the distributed cluster can compute one or more granular location level features, which the trainer 208 can aggregate upon completion. FIG. 3B illustrates a summary of an example distributed cluster classifier training method 328.

With reference now to FIG. 3A, the trainer 208 is operative or configured to intersect (304) ground truth training data 302 (i.e., a subset of the ground truth dataset 216) with the reverse DNS hostname dataset 214 for generating a list of training data including IP addresses 102, their corresponding reverse DNS hostnames 104, and their actual physical locations (latitude and longitude). For each reverse DNS hostname 104 in the training data, the trainer 208 is operative or configured to split (306) the hostname into hostname parts 308 or strings. For example, by splitting each reverse DNS hostname 104 into parts, the trainer 208 is more likely to match hostname parts 308 with possible locations.

In one example, the trainer 208 splits a reverse DNS hostname 104 on punctuation, such as dots and dashes. For example, the reverse DNS hostname 104 "ip-123.boston-ma.bigisp.com" can be split into multiple hostname parts: "ip", "123", "bostonma", "bigisip", and "com". In another example, the trainer 208 splits a reverse DNS hostname 104 whenever the reverse DNS hostname switches from letters to numbers or vice versa. For example, the reverse DNS hostname 104 "seattle1.wa.bigisp.com" can be split into hostname parts: "seattle", "1", "wa", "bigisp", and "com". Note that the string "seattle1" has been split into "seattle" and "1" since the string switched from letters to numbers.

In another example, the trainer 208 is operative or configured to split a reverse DNS hostname 104 into n-grams of a certain length or of certain lengths. For example, the reverse DNS hostname 104 "ip-123.bostonma.bigisp.com" can be split into the following hostname parts: "ip", "123", "bos", "ost", "sto", "ton", etc. In another example, the trainer 208 splits a reverse DNS hostname 104 into n-grams taken from the beginning and/or the end of a text string 106. For example, with a specification that the n-gram size is 3 and that the n-grams can be taken from the beginning and the end of a text string 106, the reverse DNS hostname 104 "ip-123.bostonma.bigisp.com" can be split into the following hostname parts: "ip", "123", "bos", "nma", "big", "isp", and "com".

In another example, the trainer 208 is operative or configured to split a reverse DNS hostname 104 using a public suffix list (i.e., domain knowledge 310) to ignore domain names when splitting. For example, when splitting reverse DNS hostnames 104 into hostname parts 308, the trainer 208 can ignore the domain part of the hostname and only use the subdomain. As an example, for the reverse DNS hostname 104 "ip-123.bostonma.bigisp.com", the domain part is "bigisp.com" and the subdomain is "ip-123.bostonma". It cannot be assumed the last two "words" are the domain, because some domains have three parts. For example, "company.co.uk" has three elements which are part of the domain: "company"; "co"; and "uk." In order to determine which part of the string is a domain, the trainer 208 is operative or configured to split the domain on dots (.), remove the suffix that ends in a public suffix, then remove the right most item. For example, for the reverse DNS hostname 104 "ip-123.london.bigisp.co.uk" the trainer 208 may first remove the public suffix ".co.uk" to obtain "ip-123.london.bigisp", and then remove the right most item to obtain "ip-123.london". The trainer 208 is operative or configured to continue to split the reverse DNS hostname 104 using one or more of the examples above.

After splitting (306) the reverse DNS hostnames 104 in the training data into hostname parts, the trainer 208 is further operative or configured to determine (312), for a particular reverse DNS hostname 104, a list of location candidates 314 using features, such as the example granular location level features shown in Table 1. For example, the trainer 208 iterates over each hostname part 308 (e.g., "ip", "123", "bostonma", "bigisp", and "corn" from the reverse DNS hostname "ip123.bostonma.bigisp.com") with each previously created granular location level feature dictionary 234 (e.g., City Name match dictionary, City+Admin1 match dictionary), and computes features for the feature class (316). According to an aspect, if a hostname part 308 can be found as a key in the current dictionary, the trainer 208 saves the value of the dictionary.

For a given reverse DNS hostname 104, after the location candidates 314 have been computed, the trainer 208 is further operative or configured to enrich the location candidates with add-on features. According to an aspect, the add-on features depend on the current context of both the input reverse DNS hostname 104 and the location candidate 314 and its features. Accordingly, add-on features cannot be precomputed like the granular location level features. One example of an add-on feature is an Admin 1 Match, wherein if the reverse DNS hostname 104 includes an Administrative Region 1 (State) name that matches the Admin 1 of the location candidate, the feature value is true. For example, given an input reverse DNS hostname 104 "ip123.seattle.wa.bigisp.com" and a candidate location Seattle, Wash., the feature value would be true because the hostname contains the string "wa", and the string "wa" is an abbreviation of Washington State, which is the same state as the candidate location (Seattle, Wash.). The below table (Table 3) includes a list of example add-on features:

TABLE 3

| Add-On Supporting Features | |
| --- | --- |
| Admin 1 Match | Does the hostname contain an Administrative Region 1 (State) name that matches the Admin 1 of the location candidate?<br>Example<br>Input hostname:<br>"ip123.seattle.wa.bigisp.com"<br>Candidate location: Seattle, WA<br>Feature value: True<br>Because: The hostname contains the string "wa", and the string "wa" is an abbreviation of Washington State, which is the same state as the candidate location (Seattle, WA). |
| First Letters Admin 1 Match | Does the hostname contain the first few letters of an Administrative Region 1 name that matches the Admin 1 of the location candidate?<br>Positive Example<br>Input hostname:<br>"ip123.boston.mass.bigisp.com"<br>Candidate location: Boston, MA<br>Feature value: True<br>Because: The hostname contains the string "mass", and the string "mass" contains the first 4 letters of |

TABLE 3-continued

| Add-On Supporting Features | |
| --- | --- |
| | Massachusetts State, which is the same state as the candidate location (Boston, MA).<br>Negative Example<br>Input hostname:<br>"ip123.boston.mass.bigisp.com"<br>Candidate location: Boston, GA (note this candidate is also called Boston but is in a different state)<br>Feature value: False<br>Because: The hostname does not contain a string that matches an alias of Georgia State. |
| Country Match | Does the hostname contain a country name that matches the country of the location candidate?<br>Example<br>Input hostname:<br>"ip123.amsterdam.nl.bigisp.com"<br>Candidate location: Amsterdam, NL<br>Feature value: True |
| Country Top Level Domain Match | Does the hostname contain a top level domain (the last part of the domain) that maps to the same country as the location candidate?<br>Positive Example<br>Input hostname:<br>"ip123.amsterdam.bigisp.nl"<br>Candidate location: Amsterdam, NL<br>Feature value: True<br>Positive Example<br>Input hostname:<br>"ip123.seattle.bigisp.us"<br>Candidate location: Seattle, WA (USA)<br>Feature value: True<br>Negative Example<br>Input hostname:<br>"ip123.seattle.bigisp.com"<br>Candidate location: Seattle, WA (USA)<br>Feature value: False |

For each hostname part 308 where a match is found in multiple dictionaries 234, the trainer 208 merges or aggregates (318) all the granular location level features of each extracted location candidate 314, generating a final granular location level feature list for each location candidate. In some examples, any missing or partial features are set (320) with feature defaults 322.

The trainer 208 is further operative or configured to train (324) the classifier 210 using the ground truth labels 326. According to an aspect, the classifier 210 is a binary classifier, where the input is a reverse DNS hostname 104 and a candidate location 314, and the output is a binary label (true or false) where true means that the candidate location is a reasonable location choice for the hostname, and false means that the candidate location is most likely not a valid location. As can be appreciated, there are multiple existing algorithms that can be used to train the classifier 210, such as decision trees (including C4.5), logistic regression, and SVM. Other algorithms are possible, and are within the scope of the disclosure.

According to an aspect, granular location level feature pre-computation can be a costly process (e.g., time, computer processing). As an alternative to training on a single machine as shown in FIG. 3A, granular location level features can be generated on a distributed cluster of machines in parallel. For example, each machine in the distributed cluster can compute one or more granular location level features, which the trainer 208 can aggregate upon completion. FIG. 3B illustrates a summary of an example distributed cluster classifier training method 328.

With reference now to FIG. 3B, the trainer 208 is operative or configured to split (306) each reverse DNS hostname 104 in the training data into hostname parts 308 or strings as described above. In a distributed cluster classifier training method 328, the trainer 208 distributes (330) the hostname parts 308 to separate server clusters 332a-n (generally 332), wherein each granular location level feature is computed separately one or a plurality of machines. In some examples, each granular location level feature is computed by a separate server cluster 332. In other examples, a same server cluster 332 is reused and computes each feature one-by-one. After each granular location level feature is computed, the trainer 208 aggregates (334) the results. Any missing or partial features are combined or set (320) with feature defaults 322 for each location candidate 314, and the trainer 208 trains (324) the classifier 210 using the ground truth labels 326 as described above with respect to FIG. 3A.

Figure 4:
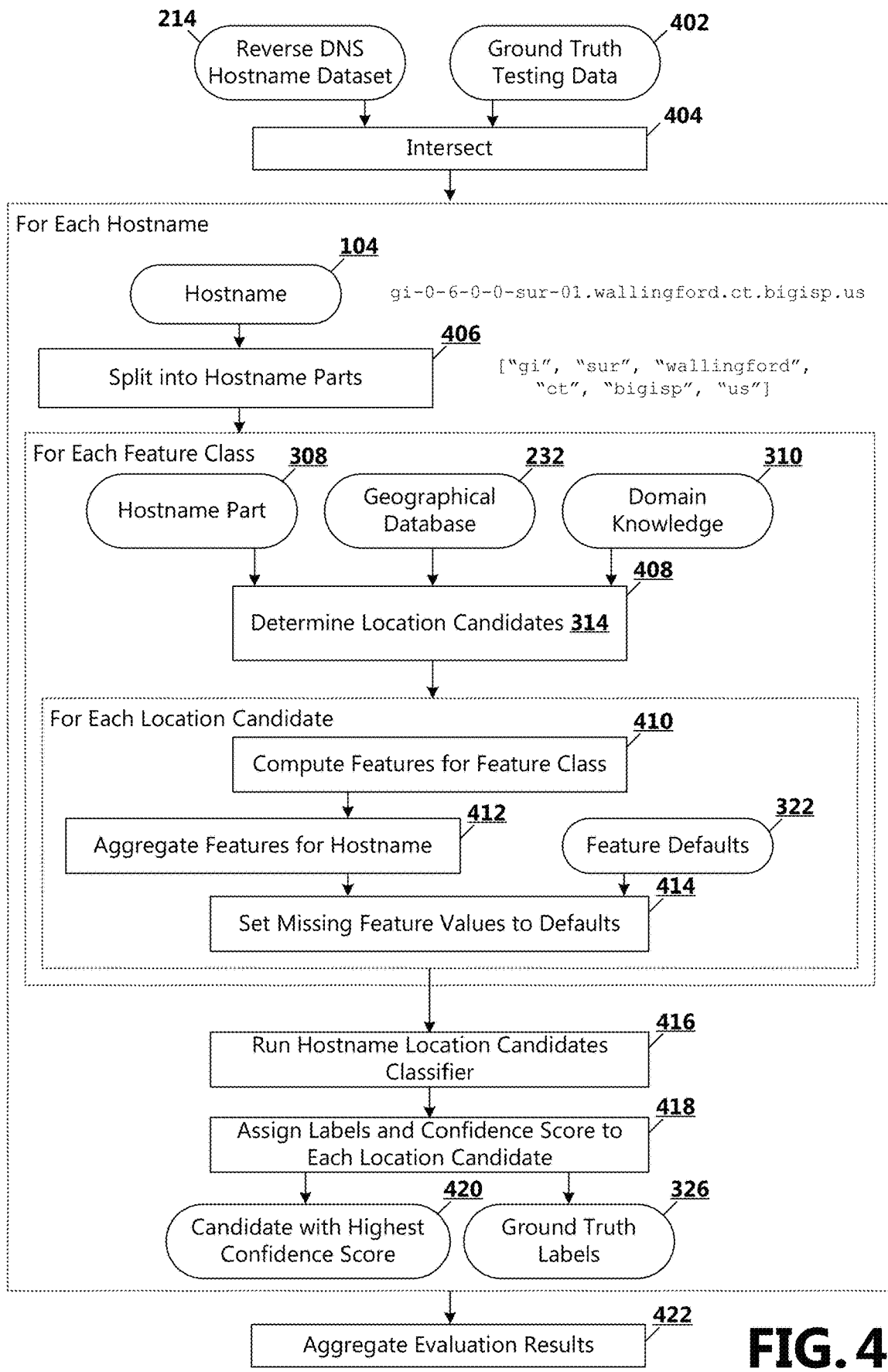
FIG. 4 illustrates a summary of an example testing portion of a training method.

According to an aspect, the geolocation database generation system 206 further comprises a tester 212, operative or configured to test the classifier 210 on an unused subset of the ground truth dataset 216 (ground truth testing data). For each reverse DNS hostname 104 in the ground truth testing data, the tester 212 is operative or configured to generate the features as described above. According to examples and with reference to FIG. 4, the tester 212 is operative or configured to intersect (404) ground truth testing data 402 (i.e., a subset of the ground truth dataset 216) with the reverse DNS hostname dataset 214. For each DNS hostname 104, the tester 212 splits (406) each reverse DNS hostname 104 into hostname parts 308, and generates (408) a list of location candidates 314 using granular location level features (as described above with respect to FIG. 3A). The tester 212 iterates over each hostname part 308 with each previously created granular location level feature dictionary 234 (e.g., City Name match dictionary, City+Admin1 match dictionary), and computes features for the feature class (410). For each hostname part 308 where a match is found in multiple dictionaries 234, the trainer 208 merges or aggregates (412) all the granular location level features of each extracted location candidate 314, generating a final granular location level feature list for each location candidate. Any missing or partial features are set (414) with feature defaults 322.

The tester 212 is further operative or configured to run (416) the classifier 210 on each location candidate 314 and the corresponding features, generating (418) a binary label (positive or negative) for each location candidate and a confidence score. The tester 212 is further operative or configured to aggregate and compare (422) the label of the location candidate with the highest confidence score 420 to the ground truth label 326. When the label of the highest ranking location candidate matches the ground truth location (e.g., a positive label on a location candidate that matches the ground truth location), the evaluation result for the particular reverse DNS hostname 104 is positive.

FIGS. 5A and 5B are illustrations of an example input and outputs of the classifier 210 using aspects of the intelligent conversation response system 206. With reference now to FIG. 5A, an example reverse DNS hostname 104 "ce-salmor0w03w.cpe.or.portland.bigisp.net" is input into the classifier 210. Using granular location level features for the reverse DNS hostname 104, a list of potential location candidates 314 are returned. The classifier 210 is operative or configured to generate a binary label 502 (positive or negative) for each location candidate 314 and a confidence score 504 (e.g., based on the feature values 508). An example subset of granular location level features 506 used for an example "Salem-OR-US" location candidate 314 is illustrated in FIG. 5B.

According to an aspect, for a given reverse DNS hostname 104, the classifier 210 can output multiple positive location candidates 314. In one example, to help decide the most probable candidate, the classifier 210 selects the candidate location 314 with the highest ranking confidence score 504. In another example, to determine the most likely candidate location, the output can be combined with other external data. One example source of external data is IP neighbor information. For example, IP addresses 102 are consecutive numbers. Reverse DNS hostnames 104 have a corresponding IP address 102, and each IP address has neighbors (the previous and next IP addresses). By combining the location candidates 314 of the current reverse DNS hostname 104 with that of its IP neighbors, the classifier 210 is able to determine the most likely candidate location. For example, the IP address 102 of the current reverse DNS hostname 104 is determined. In one example, a set of nearby IP address neighbors is chosen by selecting the previous and next n IP addresses, where n is an integer. In another example, the neighbors of an IP address 102 are defined to be the closest 256 IP address range (e.g., or IP address 52.218.160.23 define its neighbors to be any IP address between [52.218.160.0 . . . 52.218.160.255]). The reverse DNS hostname 104 of each neighbor can then be determined, and the classifier 210 can be run on each neighbor reverse DNS hostname, retaining the set of probable location candidates 314. Further, the classifier 210 is operative or configured to intersect the location candidates 314 of the target hostname with the location candidates of each neighbor, and retain the location(s) that appear most often.

In other examples, an alternate way of finding geographically co-located IP neighbors is by leveraging traceroute information. Given a source IP address A and a target IP address B, a traceroute reveals the intermediate routers through which data travels from A to B. The following table (Table 4) shows an example of a traceroute from one IP address to another. The intermediate hops revealed by the traceroute are located on the path between the source IP address and the target IP address.

TABLE 4

| Traceroute from IP 77.93.199.16 to IP 213.239.203.214 |
|---|
| traceroute to 213.133.107.227 (213.133.107.227), 30 hops max, 60 byte packets |
| 1 praha-4d-c1-vl55.masterinter.net (77.93.199.253) 0.556 ms 0.629 ms 0.712 ms |
| 2 vl1387.cr3.r1-8.dc1.4d.prg.masterinter.net (83.167.254.150) 0.177 ms 0.431 ms 0.436 ms |
| 3 vl1388.cr2.c16.127.cecolo.prg.masterinter.net (83.167.254.148) 27.720 ms |
| 4 * * * |
| 5 ae6-2011.nbg40.core-backbone.com (80.255.14.246) 27.920 ms 27.923 ms 27.905 ms |
| 6 core-backbone-100g-nbg.hetzner.de (81.95.15.6) 8.308 ms 8.292 ms 8.356 ms |
| 7 core11.nbg1.hetzner.com (213.239.229.161) 8.300 ms |
| 8 ex9k2.rz1.hetzner.de (213.133.107.227) 8.453 ms 8.458 ms 8.433 ms |

Starting from a large dataset of traceroutes between nodes on the Internet, and an IP address 102, other IP addresses, which are nearby geographically, can be determined. For example, aspects of the geolocation database generation system 206 are operative or configured to find all traceroutes in the datasets that include the target IP address anywhere on the traceroute path. From each matched traceroute, nodes which are close to the target IP address in terms of latency are extracted. For example, each millisecond roughly corresponds to 100 kilometers, so all nearby nodes which are within 1 millisecond latency from the target IP address can be identified. Aspects of the geolocation database generation system 206 are further operative or configured to determine the reverse DNS hostname 104 of each extracted neighbor, and to run the classifier 210 on each reverse DNS hostname to determine the location candidates 314. By intersecting the location candidates of the target IP with the location candidates of each neighbor and retaining the location(s) that appear most often, the classifier 210 is enabled to determine the most likely candidate location.

Figure 6:
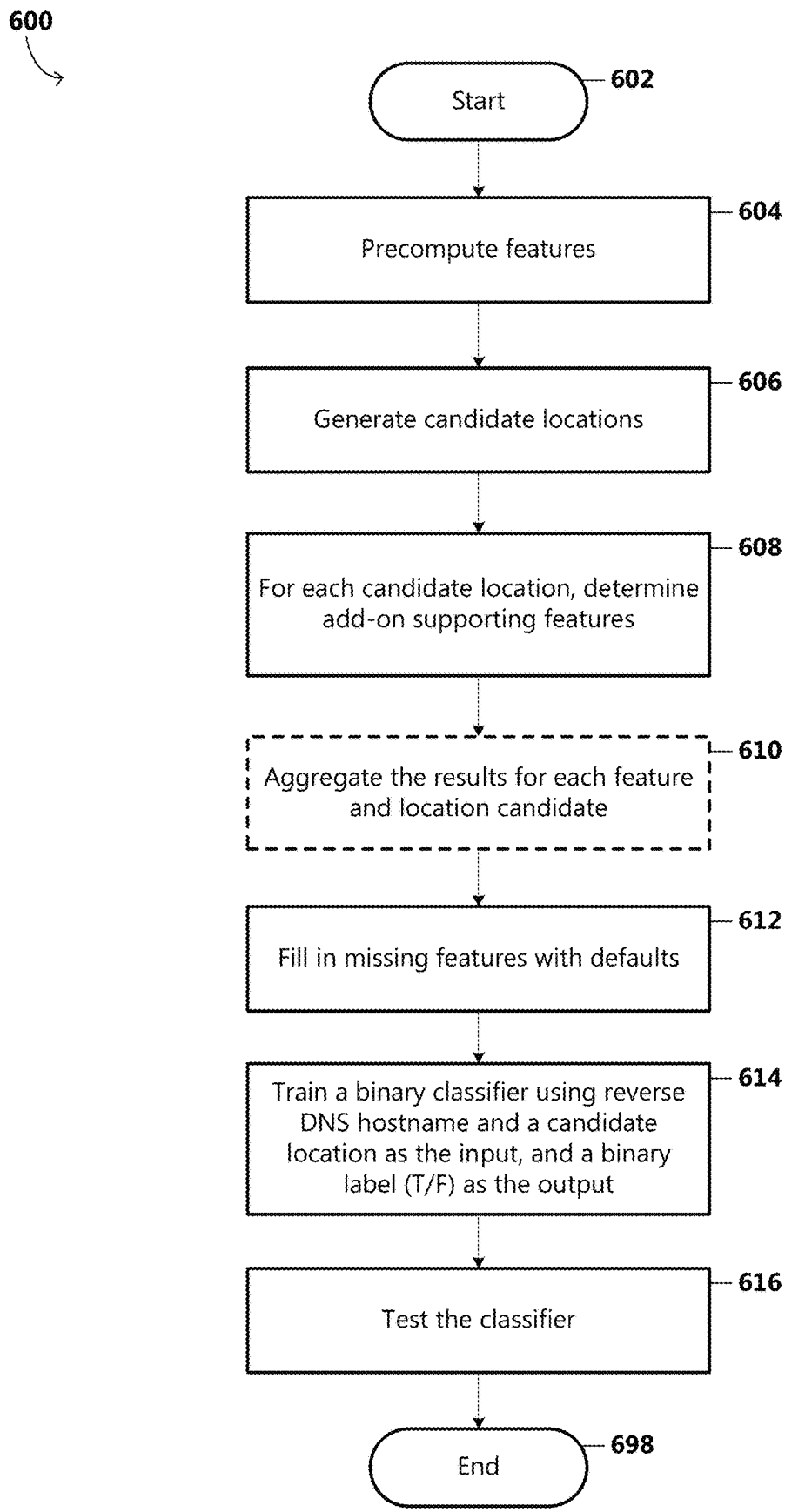
FIG. 6 is a flowchart showing general stages involved in an example method for training a classifier to determine a geolocation for an IP address.

FIG. 6 is a flow chart showing general stages involved in an example method 600 for training the classifier 210. With reference now to FIG. 6, the method 600 begins at START OPERATION 602, and proceeds to OPERATION 604, where the trainer 208 precomputes granular location level features 506. In some examples, the precomputation is performed on a single machine. In other examples, the precomputation is performed on a plurality of machines. The trainer 208 obtains data from a geographical database 232, and extracts features 506, such as the city name, abbreviations, alternate names, administrative regions (such as state name), population information, and other features of each city. For each granular location level feature type, the trainer 208 generates a dictionary 234 comprising a key and a value, where the key is a string that the classifier 210 will look for in a reverse DNS hostname 104 and the value is a list of candidate locations 314 that match the string, along with the features 506 extracted for the location.

At OPERATION 606, the trainer 208 intersects a reverse DNS hostname dataset 214 and a subset of a ground truth dataset 216 (i.e., ground truth training data 302), resulting in training data that includes a set of reverse DNS hostnames 104 for which their geolocations 222 are known. For each computed feature 506, the trainer 208 attempts to match each hostname part 308 to the feature. When a match occurs, the city associated with the matched feature is added to a list of location candidates 314.

The method 600 continues to OPERATION 608, where the trainer 208 enriches the location candidates 314 with add-on features (e.g., Table 2), which depend on the current context of both the input reverse DNS hostname 104 and the location candidate 314 and its features 506.

The method 600 proceeds to OPTIONAL OPERATION 610, where the results for each feature 506 and location candidate 314 are aggregated. For example, when precomputation of the features are distributed across a server cluster 332 of machines working together in parallel.

The method 600 continues to OPERATION 612, where any missing or partial features are filled with defaults 322, and at OPERATION 614, the binary classifier 210 is trained as described above with respect to FIGS. 3A and 3B.

At OPERATION 616, the tester 212 tests the classifier 210 to determine whether the label of the highest ranking location candidate matches the ground truth location (e.g., a positive label on a location candidate that matches the ground truth location). When the label 502 of the highest ranking location candidate 314 matches the ground truth data label 326, the evaluation result for the particular reverse DNS hostname 104 is positive. The method 600 ends at OPERATION 698.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
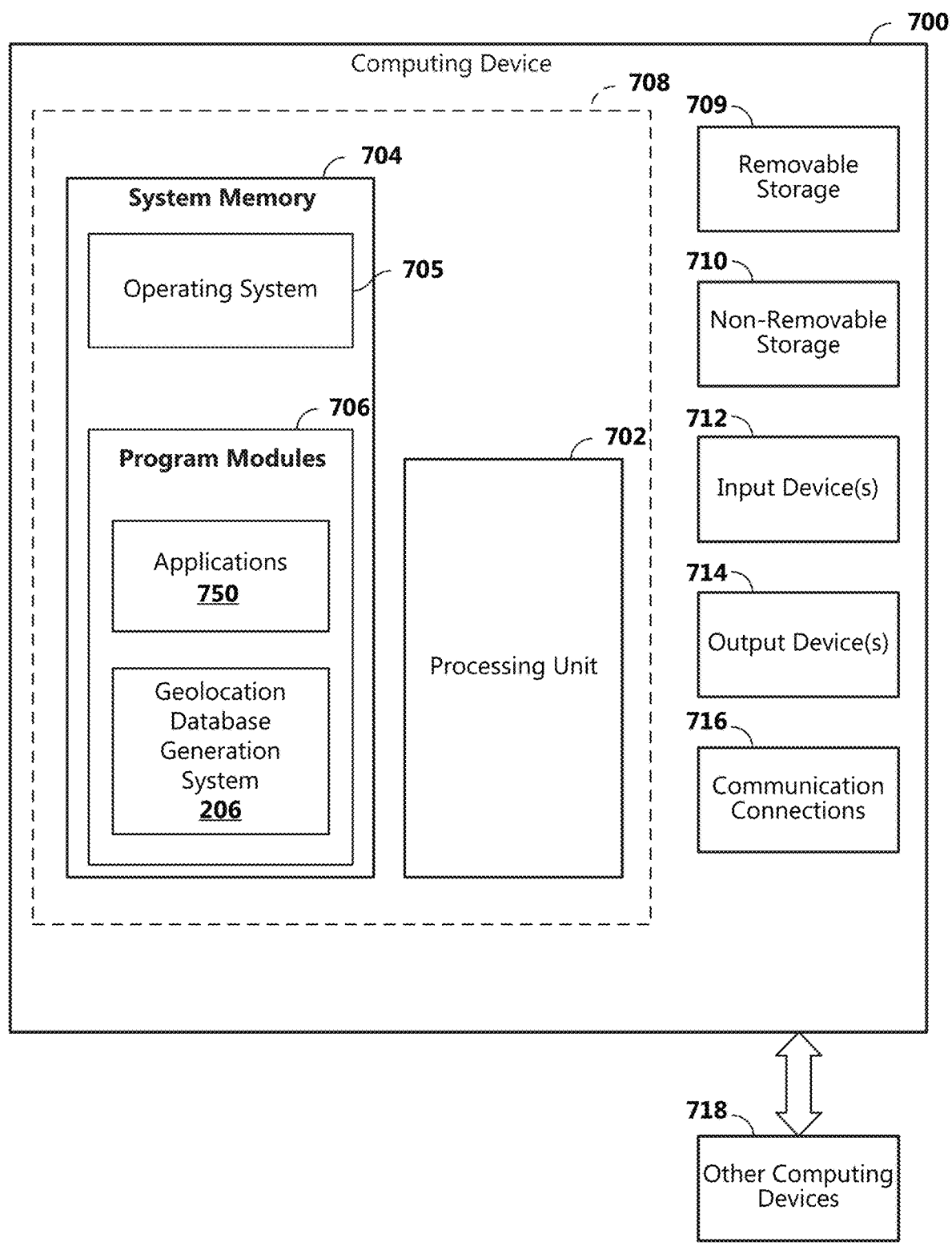
FIG. 7 is a block diagram illustrating physical components of a computing device with which examples may be practiced.
Figure 8A:
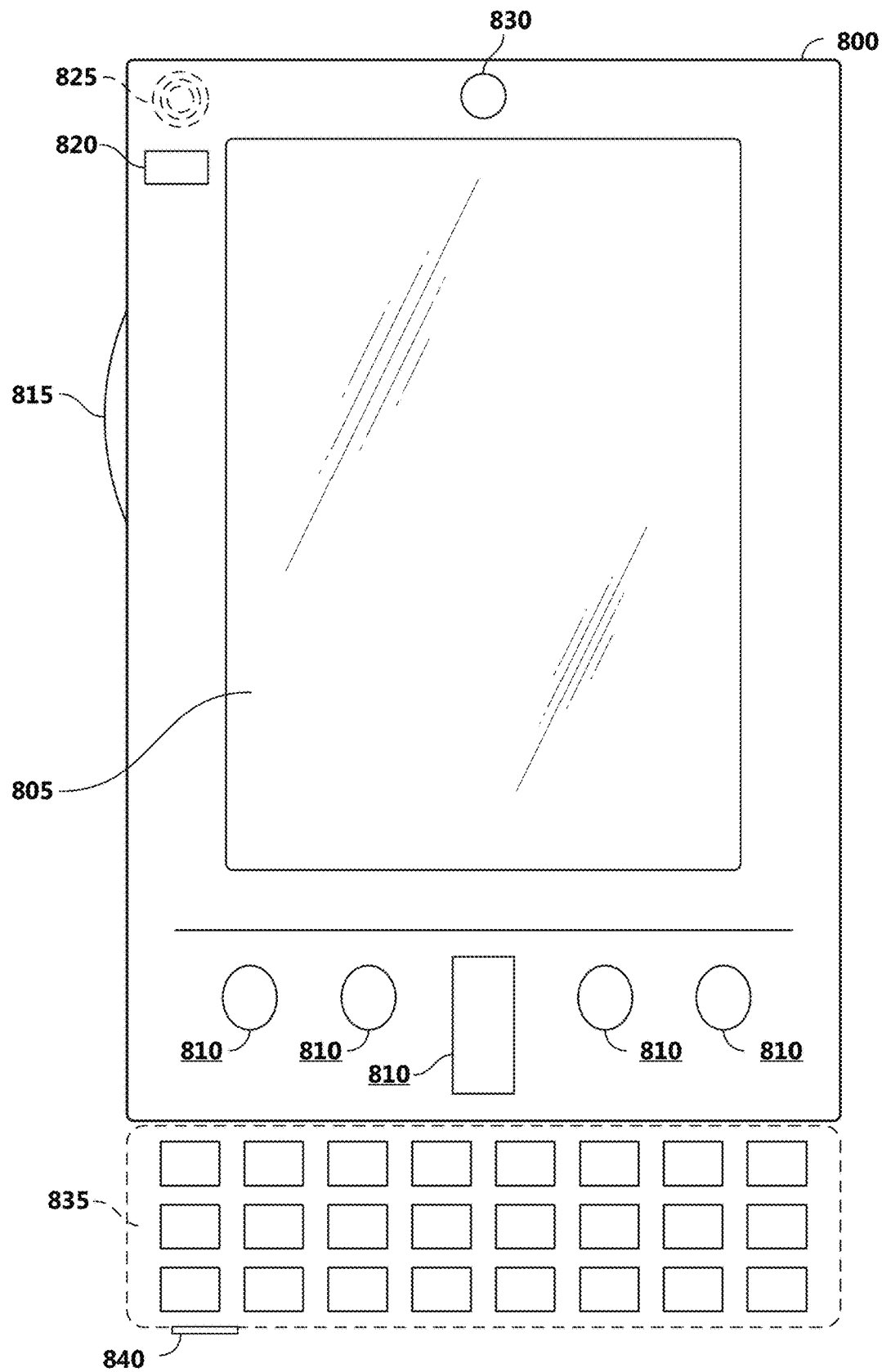
FIGS. 8A and 8B are block diagrams of a mobile computing device with which aspects may be practiced.
Figure 8B:
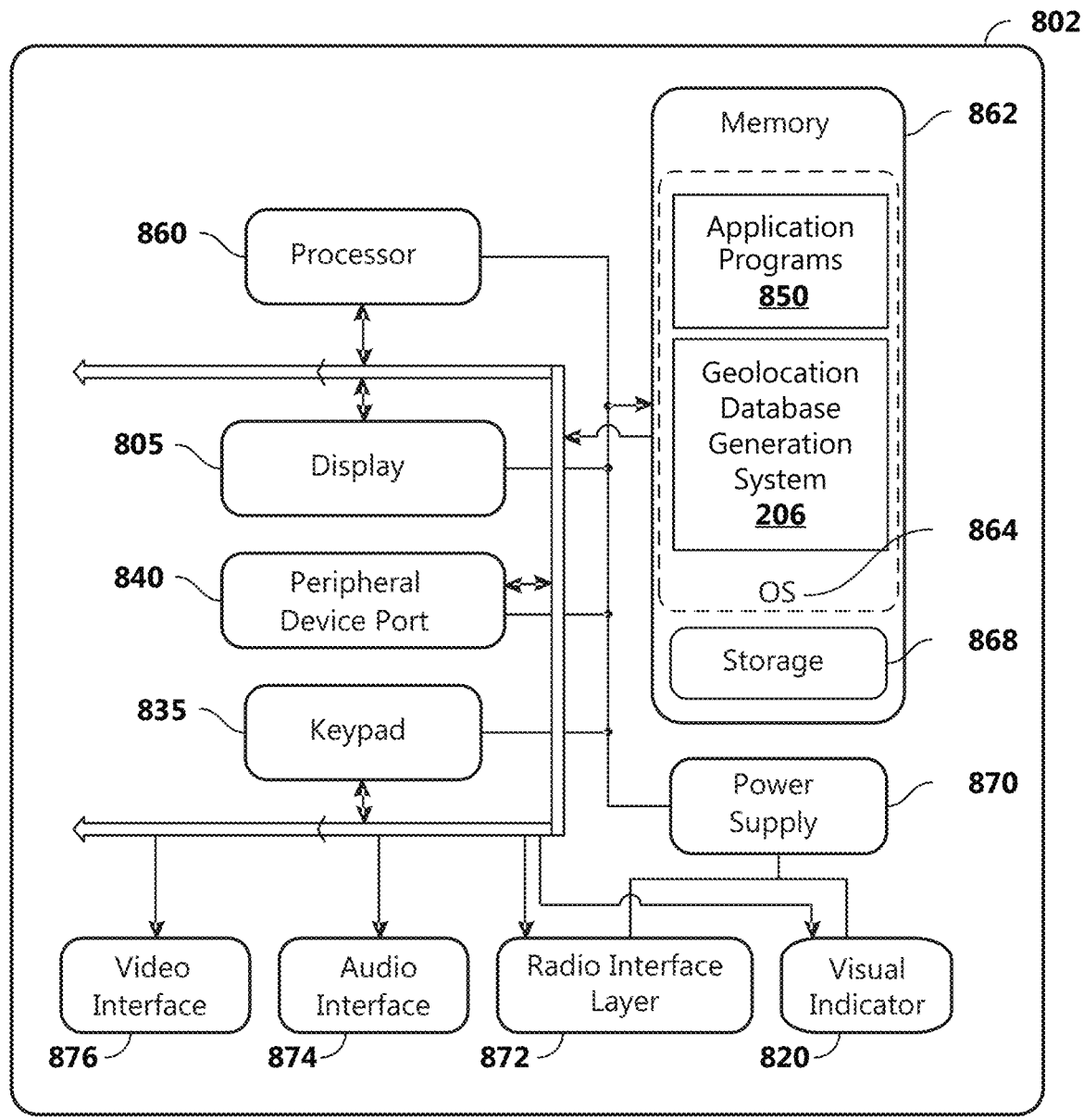
Figure 9:
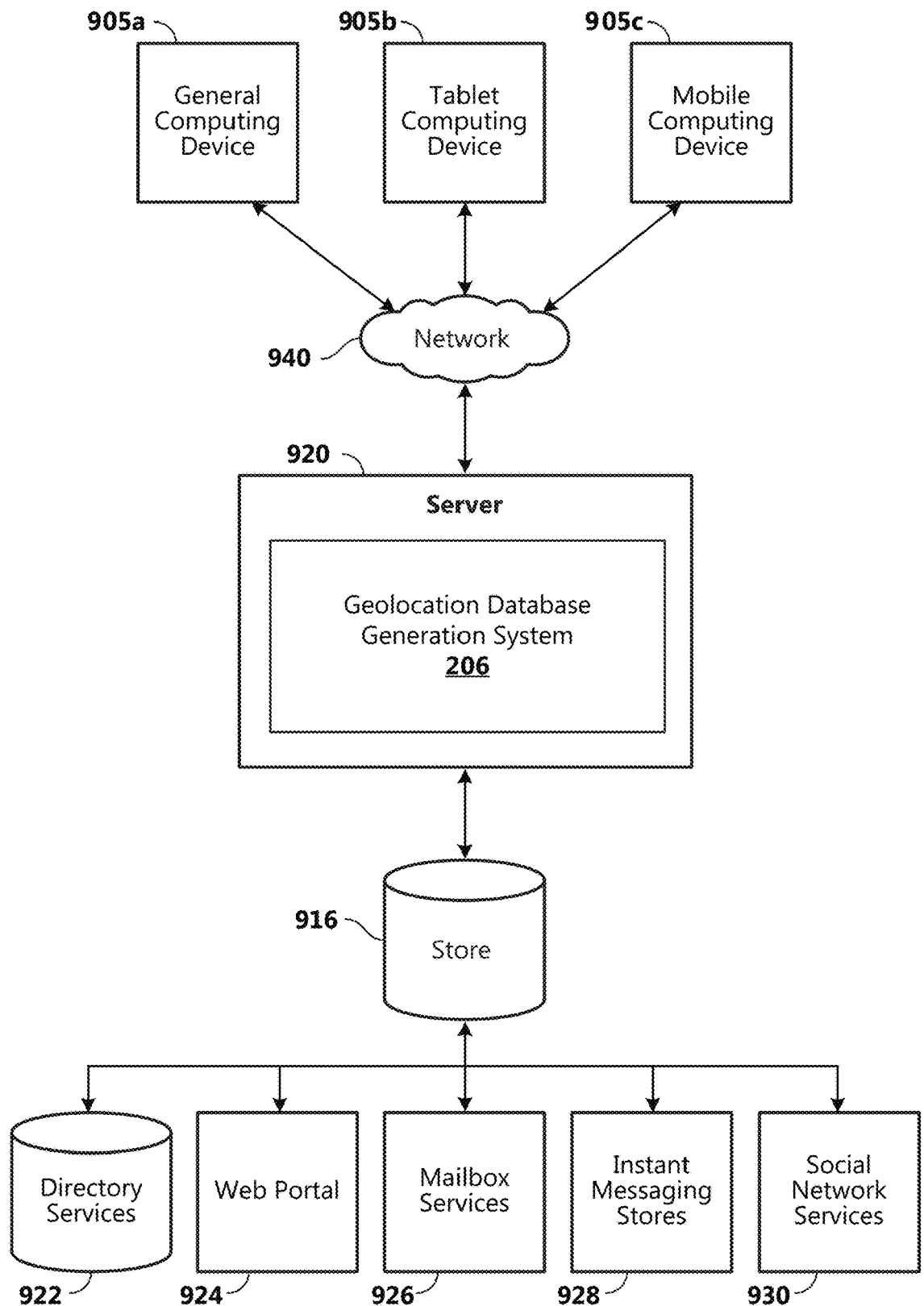
FIG. 9 is a block diagram of a distributed computing system in which aspects may be practiced.

FIGS. 7-9 and the associated descriptions provide a discussion of a variety of operating environments in which examples are practiced. However, the devices and systems illustrated and discussed with respect to FIGS. 7-9 are for purposes of example and illustration and are not limiting of a vast number of computing device configurations that are used for practicing aspects, described herein.

FIG. 7 is a block diagram illustrating physical components (i.e., hardware) of a computing device 700 with which examples of the present disclosure are be practiced. In a basic configuration, the computing device 700 includes at least one processing unit 702 and a system memory 704. According to an aspect, depending on the configuration and type of computing device, the system memory 704 comprises, but is not limited to, volatile storage (e.g., random access memory), non-volatile storage (e.g., read-only memory), flash memory, or any combination of such memories. According to an aspect, the system memory 704 includes an operating system 705 and one or more program modules 706 suitable for running software applications 750. According to an aspect, the system memory 704 includes one or more components of the geolocation database generation system 206. The operating system 705, for example, is suitable for controlling the operation of the computing device 700. Furthermore, aspects are practiced in conjunction with a graphics library, other operating systems, or any other application program, and is not limited to any particular application or system. This basic configuration is illustrated in FIG. 7 by those components within a dashed line 708. According to an aspect, the computing device 700 has additional features or functionality. For example, according to an aspect, the computing device 700 includes additional data storage devices (removable and/or non-removable) such as, for example, magnetic disks, optical disks, or tape.

Such additional storage is illustrated in FIG. 7 by a removable storage device 709 and a non-removable storage device 710.

As stated above, according to an aspect, a number of program modules and data files are stored in the system memory 704. While executing on the processing unit 702, the program modules 706 (e.g., one or more components of the geolocation database generation system 206) perform processes including, but not limited to, one or more of the stages of the method 600 illustrated in FIG. 6. According to an aspect, other program modules are used in accordance with examples and include applications such as electronic mail and contacts applications, word processing applications, spreadsheet applications, database applications, slide presentation applications, drawing or computer-aided drafting application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 7 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 700 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 700 has one or more input device(s) 712 such as a keyboard, a mouse, a pen, a sound input device, a touch input device, etc. The output device(s) 714 such as a display, speakers, a printer, etc. are also included according to an aspect. The aforementioned devices are examples and others may be used. According to an aspect, the computing device 700 includes one or more communication connections 716 allowing communications with other computing devices 718. Examples of suitable communication connections 716 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. According to an aspect, any such computer storage media is part of the computing device 700. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which aspects may be practiced. With reference to FIG. 8A, an example of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. According to an aspect, the display 805 of the mobile computing device 800 functions as an input device (e.g., a touch screen display). If included, an optional side input element 815 allows further user input. According to an aspect, the side input element 815 is a rotary switch, a button, or any other type of manual input element. In alternative examples, mobile computing device 800 incorporates more or less input elements. For example, the display 805 may not be a touch screen in some examples. In alternative examples, the mobile computing device 800 is a portable phone system, such as a cellular phone. According to an aspect, the mobile computing device 800 includes an optional keypad 835. According to an aspect, the optional keypad 835 is a physical keypad. According to another aspect, the optional keypad 835 is a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 800 incorporates peripheral device port 840, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 incorporates a system (i.e., an architecture) 802 to implement some examples. In one example, the system 802 is implemented as a "smart phone" capable of running one or more applications (e.g., browser, e-mail, calendaring, contact managers, messaging clients, games, and media clients/players). In some examples, the system 802 is integrated as a computing device, such as an integrated personal digital assistant (PDA) and wireless phone.

According to an aspect, one or more application programs 850 are loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. According to an aspect, one or more components of the geolocation database generation system 206 are loaded into memory 862. The system 802 also includes a non-volatile storage area 868 within the memory 862. The non-volatile storage area 868 is used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

According to an aspect, the system 802 has a power supply 870, which is implemented as one or more batteries. According to an aspect, the power supply 870 further includes an external power source, such as an AC adapter or a powered docking cradle that supplements or recharges the batteries.

According to an aspect, the system 802 includes a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

According to an aspect, the visual indicator 820 is used to provide visual notifications and/or an audio interface 874 is used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. According to an aspect, the system 802 further includes a video interface 876 that enables an operation of an on-board camera 830 to record still images, video stream, and the like.

According to an aspect, a mobile computing device 800 implementing the system 802 has additional features or functionality. For example, the mobile computing device 800 includes additional data storage devices (removable and/or non-removable) such as, magnetic disks, optical disks, or tape. Such additional storage is illustrated in FIG. 8B by the non-volatile storage area 868.

According to an aspect, data/information generated or captured by the mobile computing device 800 and stored via the system 802 is stored locally on the mobile computing device 800, as described above. According to another aspect, the data is stored on any number of storage media that is accessible by the device via the radio 872 or via a wired connection between the mobile computing device 800 and a separate computing device associated with the mobile computing device 800, for example, a server computer in a distributed computing network, such as the Internet. As should be appreciated such data/information is accessible via the mobile computing device 800 via the radio 872 or via a distributed computing network. Similarly, according to an aspect, such data/information is readily transferred between computing devices for storage and use according to well-known data/information transfer and storage means, including electronic mail and collaborative data/information sharing systems.

FIG. 9 illustrates one example of the architecture of a system for providing an improved geolocation database 218, as described above. Content developed, interacted with, or edited in association with one or more components of the geolocation database generation system 206 is enabled to be stored in different communication channels or other storage types. For example, various documents may be stored using a directory service 922, a web portal 924, a mailbox service 926, an instant messaging store 928, or a social networking site 930. One or more components of the geolocation database generation system 206 are operative or configured to use any of these types of systems or the like for providing an improved geolocation database 218, as described herein. According to an aspect, a server 920 provides one or more components of the geolocation database generation system 206 to clients 905a,b,c. As one example, the server 920 is a web server providing one or more components of the geolocation database generation system 206 over the web. The server 920 provides one or more components of the geolocation database generation system 206 over the web to clients 905 through a network 940. By way of example, the client computing device is implemented and embodied in a personal computer 905a, a tablet computing device 905b or a mobile computing device 905c (e.g., a smart phone), or other computing device. Any of these examples of the client computing device are operable to obtain content from the store 916.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for accurately converting an IP address to a geolocation, comprising:
    a processing unit; and
    a memory, including computer readable instructions, which when executed by the processing unit is operative to:
        access a geographical database comprising features associated with a plurality of locations;
        generate on a distributed cluster of computing devices a plurality of dictionaries based on the geographical database, wherein each dictionary is associated with a feature type and comprises a distinct_key for matching against a part of a reverse DNS hostname and a value comprising a list of candidate locations that match the distinct key and features extracted from the geographical database for the each candidate location;
        train a classifier using a set of ground truth training data, the ground truth training data comprising IP addresses of which the geolocation is known, wherein the classifier is operative to:
            receive a reverse DNS hostname as an input; and
            based on the plurality of dictionaries, generate a list of candidate locations with a corresponding binary label, wherein the label indicates whether the corresponding candidate location is a likely location for the reverse DNS hostname, wherein generating the list of candidate locations comprises:
                splitting the input reverse DNS hostname into hostname parts;
                iterating over each hostname part against the plurality of dictionaries for determining whether the hostname part matches a key in a dictionary;
                when a hostname part matches a key, saving the value of the dictionary; and
                for each hostname part where a match is found in a dictionary, merging the features of each candidate location.

2. The system of claim 1, wherein prior to training the classifier, the system is further operative to access the ground truth training data, wherein in accessing the ground truth training data, the system is operative to:
    obtain a dataset of IP addresses of which the geolocations are known;
    split the dataset of IP addresses into a plurality of buckets;
    assign each bucket to a slave computing device, wherein for each IP address in its assigned bucket, each slave computing device makes a reverse DNS request to obtain a reverse DNS hostname for the IP address; and
    aggregate the reverse DNS hostnames from each slave computing device.

3. The system of claim 1, wherein prior to training the classifier, the system is further operative to access the ground truth training data, wherein in accessing the ground truth training data, the system is operative to use a consistent hashing in a decentralized server cluster, wherein each server:
    automatically determines a subset of an IP address dataset for which it is responsible based on the IP address dataset, a number of servers in the server cluster, and a position of the server in the server cluster;
    for each IP address in the IP address dataset for which it is responsible, make a reverse DNS request to obtain a reverse DNS hostname for the IP address; and
    store the reverse DNS hostnames in a centralized data store.

4. The system of claim 1, wherein the feature types with which the plurality of dictionaries are associated include at least one of:
    a city name;
    an administrative region;
    a country;
    a city name without vowels;
    an alternate city name; and
    an abbreviated city name.

5. The system of claim 1, wherein in splitting the input reverse DNS hostname into a plurality of hostname parts, the system is operative or configured to split the input reverse DNS hostname based on at least one of:
    punctuation;
    a switch from a letter to a number;
    a switch from a letter to a number;
    n-grams of a certain length; and
    a public suffix list.

6. The system of claim 1, wherein the system is further operative or configured to enrich the location candidates with add-on features, wherein the add-on features depend on a current context of both the input reverse DNS hostname and the location candidate and its features.

7. The system of claim 1, wherein the system is operative or configured to generate the plurality of dictionaries as a precomputation process prior to training the classifier.

8. The system of claim 1, wherein the classifier is further operative or configured to:
    calculate a confidence score for each candidate location; and
    select a candidate location as a probable geolocation for the reverse DNS hostname based on a highest ranking confidence score.

9. The system of claim 1, wherein the system is further operable to disambiguate between candidate locations for a reverse DNS hostname, wherein in disambiguating, the system is operable to:
    determine the IP address of the reverse DNS hostname;
    select a set of nearby IP address neighbors;
    determine the reverse DNS hostname of each neighbor;
    run the classifier on each neighbor reverse DNS hostname;
    generate a set of probable location candidates for each neighbor;
    intersect the location candidates with the probable location candidates for each neighbor; and
    select a candidate location as a probable geolocation for the reverse DNS hostname based on a most-frequently occurring location candidate.

10. The system of claim 1, wherein the system is further operable to disambiguate between candidate locations for a reverse DNS hostname, wherein in disambiguating, the system is operable to:
    determine the IP address of the reverse DNS hostname;
    obtain a dataset of traceroutes between nodes on the Internet and an IP address;

identify traceroutes in the dataset that includes the target IP address of the reverse DNS hostname on the traceroute path;

from each matched traceroute, extract nodes which are close to the target IP address based on latency;

determine the reverse DNS hostname of each extracted node;

run the classifier on each reverse DNS hostname of each extracted node;

determine the location candidates;

intersect the location candidates of the reverse DSN hostname with the location candidates of each extracted node; and select a candidate location as a probable geolocation for the reverse DNS hostname based on a most-frequently occurring location candidate.

11. A method for accurately converting an IP address to a geolocation, comprising:

accessing a geographical database comprising features associated with a plurality of locations;

generating, by a plurality of distributed computing devices, a plurality of dictionaries based on the geographical database, wherein each dictionary is associated with a feature type and comprises a distinct key for matching against a part of a reverse DNS hostname and a value comprising a list of candidate locations that match the distinct key and features extracted from the geographical database for the each candidate location;

training a classifier using a set of ground truth training data, the ground truth training data comprising IP addresses of which the geolocation is known, wherein the classifier is operative to:

receive a reverse DNS hostname as an input; and based on the plurality of dictionaries, generate a list of candidate locations with a corresponding binary label, wherein the label indicates whether the corresponding candidate location is a likely location for the reverse DNS hostname, wherein generating the list of candidate locations comprises:

splitting the input reverse DNS hostname into hostname parts;

iterating over each hostname part against the plurality of dictionaries for determining whether the hostname part matches a key in a dictionary;

when a hostname part matches a key, saving the value of the dictionary; and for each hostname part where a match is found in a dictionary, merging the features of each candidate location.

12. The method of claim 11, wherein splitting the input reverse DNS hostname into a plurality of hostname parts comprises splitting the input reverse DNS hostname based on at least one of:

punctuation;

a switch from a letter to a number;

a switch from a letter to a number;

n-grams of a certain length; and a public suffix list.

13. The method of claim 11, further comprising enriching the location candidates with add-on features, wherein the add-on features depend on a current context of both the input reverse DNS hostname and the location candidate and its features.

14. The method of claim 11, wherein training the classifier comprises one of:

training the classifier on a single machine; or training the classifier on a distributed cluster of machines.

15. The method of claim 11, wherein generating the list of candidate locations further comprises:

calculating a confidence score for each candidate location; and selecting a candidate location as a probable geolocation for the reverse DNS hostname based on a highest ranking confidence score.

16. The method of claim 11, wherein generating the list of candidate locations further comprises disambiguating between candidate locations for the reverse DNS hostname, wherein disambiguating between candidate locations comprises:

determining the IP address of the reverse DNS hostname;

selecting a set of nearby IP address neighbors;

determining the reverse DNS hostname of each neighbor;

running the classifier on each neighbor reverse DNS hostname;

generating a set of probable location candidates for each neighbor;

intersecting the location candidates with the probable location candidates for each neighbor; and selecting a candidate location as a probable geolocation for the reverse DNS hostname based on a most-frequently occurring location candidate.

17. The method of claim 11, wherein generating the list of candidate locations further comprises disambiguating between candidate locations for a reverse DNS hostname, wherein disambiguating between candidate locations comprises:

determining the IP address of the reverse DNS hostname;

obtaining a dataset of traceroutes between nodes on the Internet and an IP address;

identifying traceroutes in the dataset that includes the target IP address of the reverse DNS hostname on the traceroute path;

from each matched traceroute, extracting nodes which are close to the target IP address based on latency;

determining the reverse DNS hostname of each extracted node;

running the classifier on each reverse DNS hostname of each extracted node;

determining the location candidates;

intersecting the location candidates of the reverse DSN hostname with the location candidates of each extracted node; and selecting a candidate location as a probable geolocation for the reverse DNS hostname based on a most-frequently occurring location candidate.

18. A computer storage media storing computer readable instructions, which when executed by a processing unit is operative or configured to:

access a geographical database comprising features associated with a plurality of locations;

generate a plurality of dictionaries based on the geographical database, wherein each dictionary is associated with a feature type and comprises a key for matching against a part of a reverse DNS hostname and a value comprising a list of candidate locations that match the key and features extracted from the geographical database for the each candidate location;

train a classifier using a set of ground truth training data, the ground truth training data comprising reverse DNS hostnames for IP addresses of which the geolocation is known, wherein the classifier is operative to:

receive a reverse DNS hostname as an input; and based on the plurality of dictionaries, generate a list of candidate locations with a corresponding binary label indicating whether the corresponding candidate location is a likely location for the reverse DNS hostname, wherein generating the list of candidate locations comprises:
- splitting the input reverse DNS hostname into hostname parts; and
- iterating over each hostname part against the plurality of dictionaries for determining whether the hostname part matches a key in a dictionary;
- when a hostname part matches a key, saving the value of the dictionary; and
- for each hostname part where a match is found in a dictionary, merging the features of each candidate location.

19. The computer storage media of claim 18, wherein prior to training the classifier, the system is further operative to access the ground truth training data, wherein in accessing the ground truth training data, the processing unit is operative to:
- obtain a dataset of IP addresses of which the geolocations are known;
- split the dataset of IP addresses into a plurality of buckets;
- assign each bucket to a slave computing device, wherein for each IP address in its assigned bucket, each slave computing device makes a reverse DNS request to obtain a reverse DNS hostname for the IP address; and
- aggregate the reverse DNS hostnames from each slave computing device.

20. The computer storage media of claim 18, wherein prior to training the classifier, the processing unit is further operative to access the ground truth training data, wherein in accessing the ground truth training data, the system is operative to use a consistent hashing in a decentralized server cluster, wherein each server:
- automatically determines a subset of an IP address dataset for which it is responsible based on the IP address dataset, a number of servers in the server cluster, and a position of the server in the server cluster;
- for each IP address in the IP address dataset for which it is responsible, make a reverse DNS request to obtain a reverse DNS hostname for the IP address; and
- store the reverse DNS hostnames in a centralized data store.

* * * * *